(12) United States Patent
Lai

(10) Patent No.: US 6,691,842 B1
(45) Date of Patent: Feb. 17, 2004

(54) SHOCK ABSORBER FOR A RADIO CONTROL MODEL

(76) Inventor: Aling Lai, P.O. Box 2103, Taichung (TW)

( * ) Notice: Subject to any disclaimer, the term of this patent is extended or adjusted under 35 U.S.C. 154(b) by 0 days.

(21) Appl. No.: 10/354,392

(22) Filed: Jan. 31, 2003

(51) Int. Cl.[7] .................................................. F16F 9/56
(52) U.S. Cl. ............................. 188/282.7; 188/322.15
(58) Field of Search ....................... 188/282.1, 282.7, 188/322.15, 322.22

(56) References Cited

U.S. PATENT DOCUMENTS

| | | | | |
|---|---|---|---|---|
| 2,745,517 A | * | 5/1956 | Zook ........................ | 188/282.7 |
| 3,461,991 A | * | 8/1969 | Arendarski ............... | 188/282.7 |
| 4,337,849 A | * | 7/1982 | Siorek et al. ............. | 188/276 |
| 4,588,054 A | * | 5/1986 | LeBaron .................... | 188/280 |
| 5,106,065 A | * | 4/1992 | Staton et al. ............. | 267/64.11 |

* cited by examiner

Primary Examiner—Christopher P. Schwartz

(57) ABSTRACT

A shock absorber for a radio control model includes a cylinder and a piston reciprocally received in the cylinder. The piston has an annular groove defined in the periphery thereof and dividing the piston into an upper portion and a lower portion. At least two first holes are defined in the upper portion and communicates with the annular groove. At least one second hole is defined in the lower portion and communicates with the annular groove. At least one of the second hole co-axially aligns with a corresponding one of the at least two first holes and the number of the first hole is greater than that of the second hole. At least one stopper is received in the piston between the first hole and the second hole that align with each other for selectively closing the first hole and the second hole.

7 Claims, 8 Drawing Sheets

US 6,691,842 B1

SHOCK ABSORBER FOR A RADIO CONTROL MODEL

BACKGROUND OF THE INVENTION

1. Field of the Invention

The present invention relates to a shock absorber, and more particularly to a shock absorber for a radio control model.

2. Description of Related Art

A conventional shock absorber for a radio control model in accordance with the prior art shown in FIG. 6 is adapted to be pivotally mounted between a bracket (71) and a linkage (72) of a frame (7) of the radio control model for absorbing shocks from the supporting surface.

Generally speaking, the shock absorber usually contains oil to promote the damping modulus of absorbing shock. However, the radio control model usually operated in a high speed such that the shock absorber must has a great damping modulus during absorbing shock and a small damping modulus during restituting.

With reference to FIG. 6, the conventional shock absorber comprises a cylinder (81) for containing oil and having an upper end pivotally connected to the bracket (71). A piston (82) is reciprocally movably received in the cylinder (81). The piston (82) has a diameter smaller than an inner diameter of the cylinder (81) such that a gap (A) is formed between an inner periphery of the cylinder (81) and the piston (82). The piston (82) has multiple through holes (821) longitudinally defined in the piston (82) and a plastic film (83) secured on a top surface of the piston (82) for selectively closing the through holes (821) in the piston (82). A shaft (84) has a first end securely connected to a bottom of the piston (82), and a second end extending out of the cylinder (81) and pivotally mounted to the linkage (72) that is connected to a wheel axle of the radio control model. A spring (85) is compressively mounted around the conventional shock absorber.

With reference to FIG. 7, the piston (82) is upwardly moved to compress the oil in the cylinder (81) by the shaft (84) and the spring (85) is compressed when the linkage (72) is lifted duo to a rough supporting surface, thereby the plastic film (83) securely abuts the piston (82) for closing the through holes (821) due to a pressure of compressed oil in the cylinder (81) such that the oil only flows and passes through the gap (A). Consequently, the conventional shock absorber has a greater damping modulus for absorbing shock.

With reference to FIG. 8, the plastic film (83) is upwardly pushed by the oil of backflow and the through hole (821) is opened during the piston (82) moving to the original condition of the shock absorber due the pressure of the compressed oil and the restitution force of the spring (85) when the shock disappears. Consequently, the damping modulus of the shock absorber is smaller than that of the shock absorber when the plastic film (83) closing the through hole (821) because the oil of backflow can flow through the through hole (821) in the piston (82) and the gap (A) such that the piston (82) quickly moves back to the original position.

As described above, the plastic film (83) is transformed to open the through hole (821) in the piston (82) for changing the damping modulus of the shock absorber. However, the plastic film (83) will be deteriorated after being dipped in oil for a long time. Furthermore, the piston (82) is continuously and reciprocally moved in the cylinder (81) so that the oil in the cylinder (81) will become high. The plastic film (83) easily, has a permanent deformation even broken due to the high temperature of the oil in the cylinder (81). Then the plastic film (83) should not effectively cover and close the through hole (821), thereby the conventional shock absorber cannot effectively absorb the shock when the radio control model is operated.

The present invention has arisen to mitigate and/or obviate the disadvantages of the conventional shock absorber for a radio control model.

SUMMARY OF THE INVENTION

The main objective of the present invention is to provide an improved shock absorber for a radio control model.

To achieve the objective, the shock absorber in accordance with the present invention comprises a cylinder and a piston reciprocally received in the cylinder. The piston has an annular groove defined in the periphery thereof and dividing the piston into an upper portion and a lower portion. At least two first holes are defined in the upper portion and communicates with the annular groove. At least one second hole is defined in the lower portion and communicates with the annular groove.

At least one of the second hole co-axially aligns with a corresponding one of the at least two first holes and the number of the first hole is greater than that of the second hole. At least one stopper is received in the piston between the first hole and the second hole that align with each other for selectively closing the first hole and the second hole.

Further benefits and advantages of the present invention will become apparent after a careful reading of the detailed description with appropriate reference to the accompanying drawings.

DETAILED DESCRIPTION OF THE INVENTION

Figure 1:
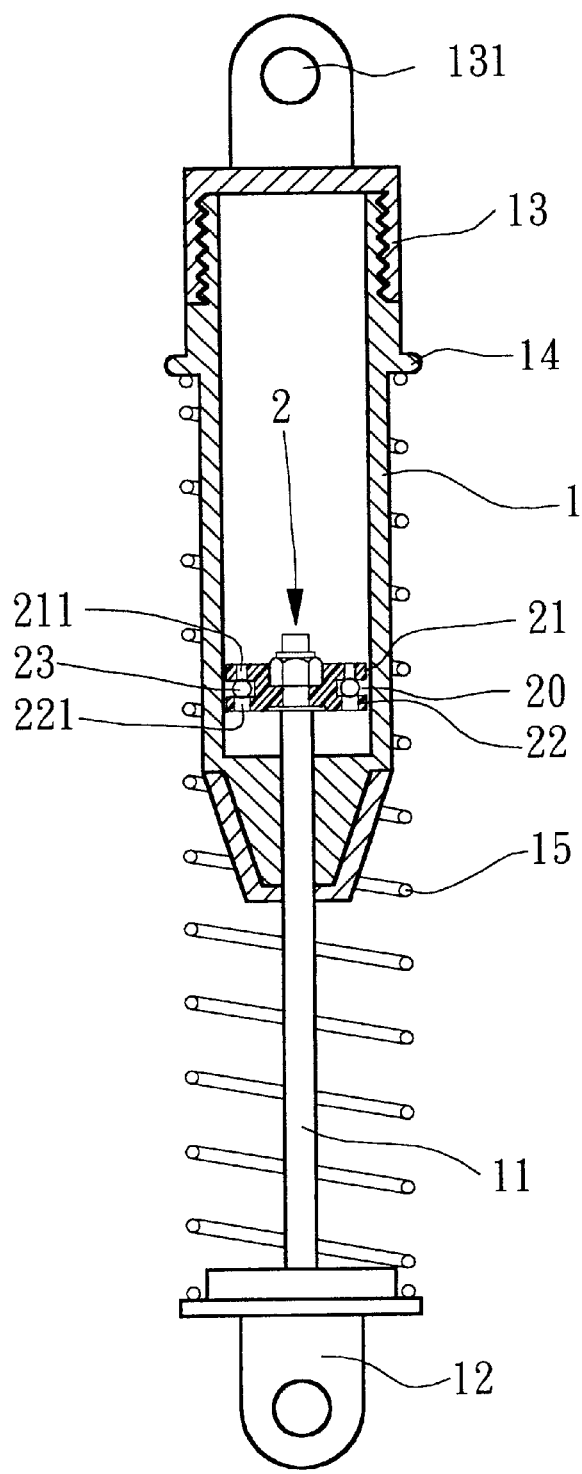
FIG. 1 is a side cross sectional view of a shock absorber for a radio control model in accordance with the present invention.
Figure 2:
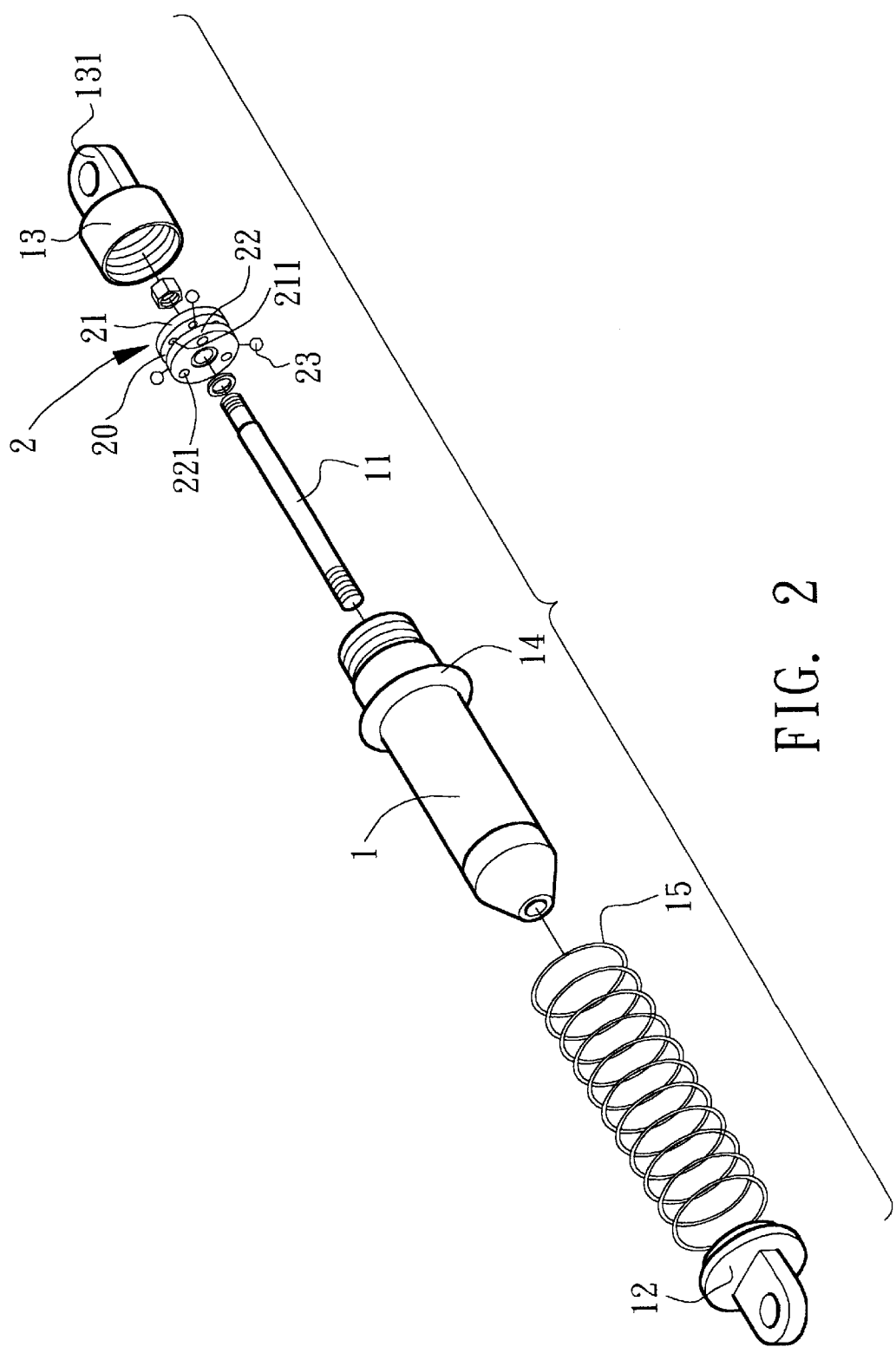
FIG. 2 is an exploded perspective view of the shock absorber in FIG. 1.
Figure 3:
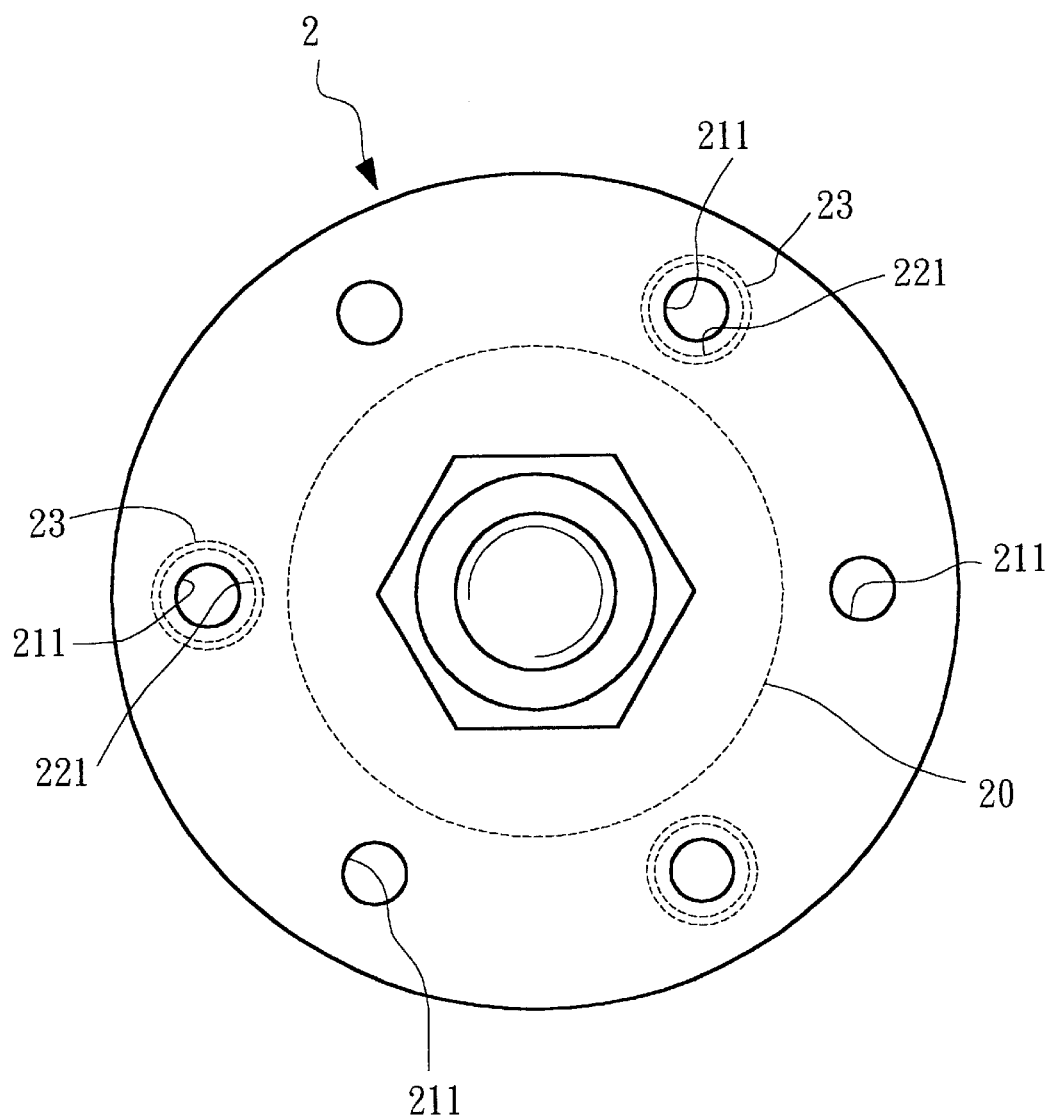
FIG. 3 is a top plan view of a piston of the shock absorber in FIG. 1

Referring to the drawings and initially to FIGS. 1–3, a shock absorber for a radio control model in accordance with the present invention comprises a cylinder (1) containing oil therein and a piston (2) reciprocally movably received in the cylinder (1). The piston (2) has a diameter smaller than an internal diameter of the cylinder (1) such that a gap (B) is formed between a periphery of the piston (2) and an inner periphery of the cylinder (1). A shaft (11) has a first end extending into the cylinder (1) and securely connected to the piston (2), and a second end pivotally connected to a linkage of the radio control model. A cap (13) is secured on one end of the cylinder (1) opposite to the shaft (11) and pivotally connected to a frame of the radio control model. A pivot seat (12) is secured on the second end of the shaft (11) for pivotally connecting the shaft (11) to the linkage of the radio control model. The cylinder (1) has an annular flange (14) laterally extending from an outer periphery of the cylinder (1) such that a spring (15) is compressively mounted between the annular flange (14) and the pivot seat (12) and around the cylinder (1) and the shaft (11).

The piston (2) includes an annular groove (20) radially defined in the periphery and dividing the piston (2) into a first portion (21) corresponding to the cap (13) and a second portion (22) corresponding to the pivot seat (12). The piston (2) includes at least two first through holes (211) defined in the first portion (21) of the piston (2) and communicating with the annular groove (20), and at least one second through hole (221) defined in the second portion (22) of the piston (2) and communicating with the annular groove (20). The second through hole (221) has a diameter greater than that of the first through hole (211). There is at least one second through hole (221) co-axially aligning with a corresponding one of the first through holes (211). At least one stopper (23) is longitudinally movably received in the piston (2) and between the first through hole (211) and the second through hole (221) that align with each other for selectively closing the second through hole (221) and the first through hole (211). The number of the first through holes (211) is greater than that of the second through hole (221). In the preferred embodiment of the present invention, the piston (2) has six first through holes (211) defined in the first portion (21) of the piston (2) and three second through holes (221) defined in the second portion (22) of the piston (2), and the stopper (23) is a steel ball and has a diameter greater than a width of the annular groove (20) in the piston (32) to prevent the stopper (23) from detaching from the piston (2).

Figure 4:
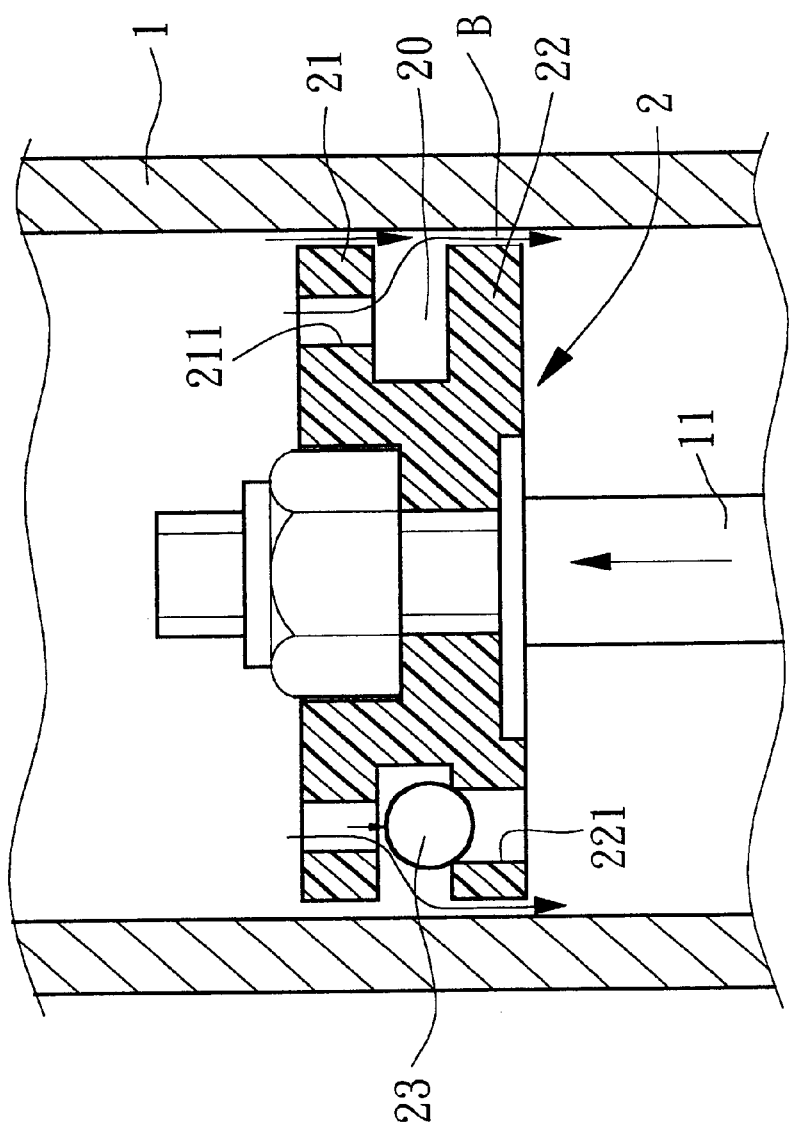
FIG. 4 is a partial side cross sectional view of the shock absorber in FIG. 1 when the piston is upwardly moved for absorbing shock.

With reference to FIG. 4, the piston (2) is upwardly moved to compress the oil in the cylinder (1) by the shaft (11) and the spring (15) is compressed when the linkage of the radio control model id lifted duo to a rough supporting surface, thereby the stopper (23) is pushed to abut the second portion (22) for closing the second through hole (221) due to the pressure of the compressed oil in the cylinder (1) such that the oil only flows and passes through the gap (B) for providing a greater damping modulus to the shock absorber to absorb shock during operated.

Figure 5:
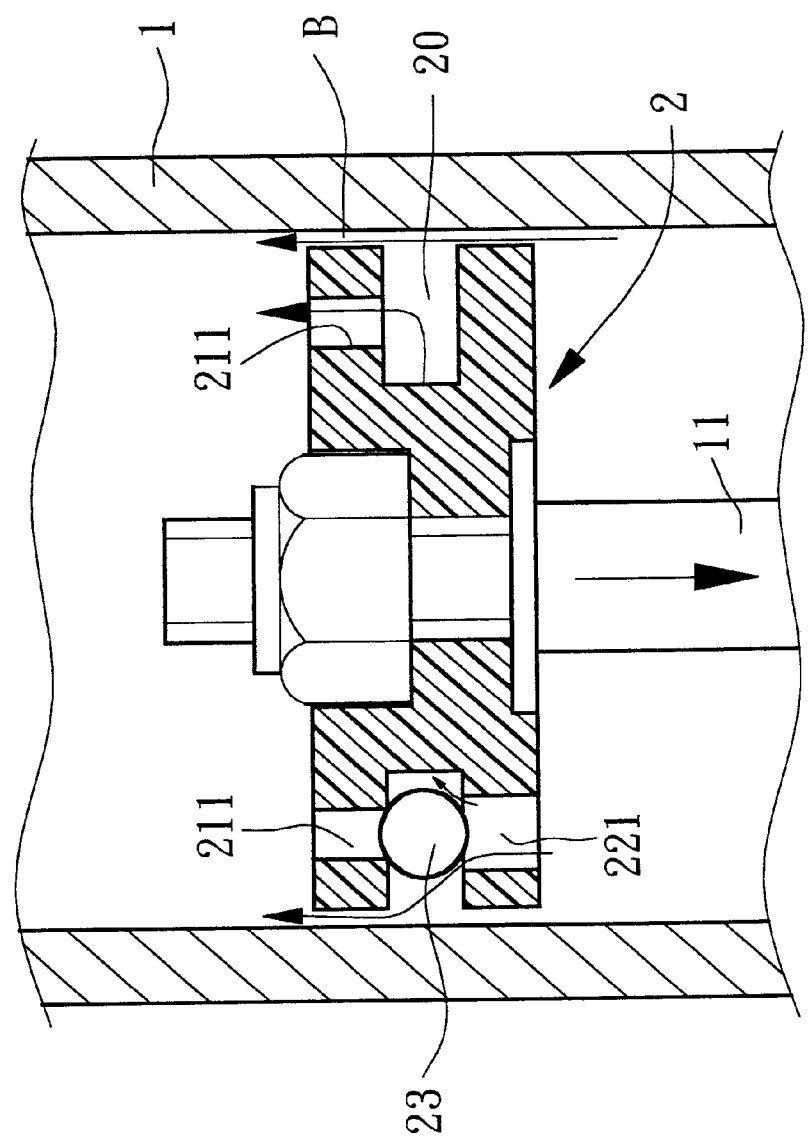
FIG. 5 is a partial side cross sectional view of the shock absorber in FIG. 1 when the piston is downward moved.
Figure 6:
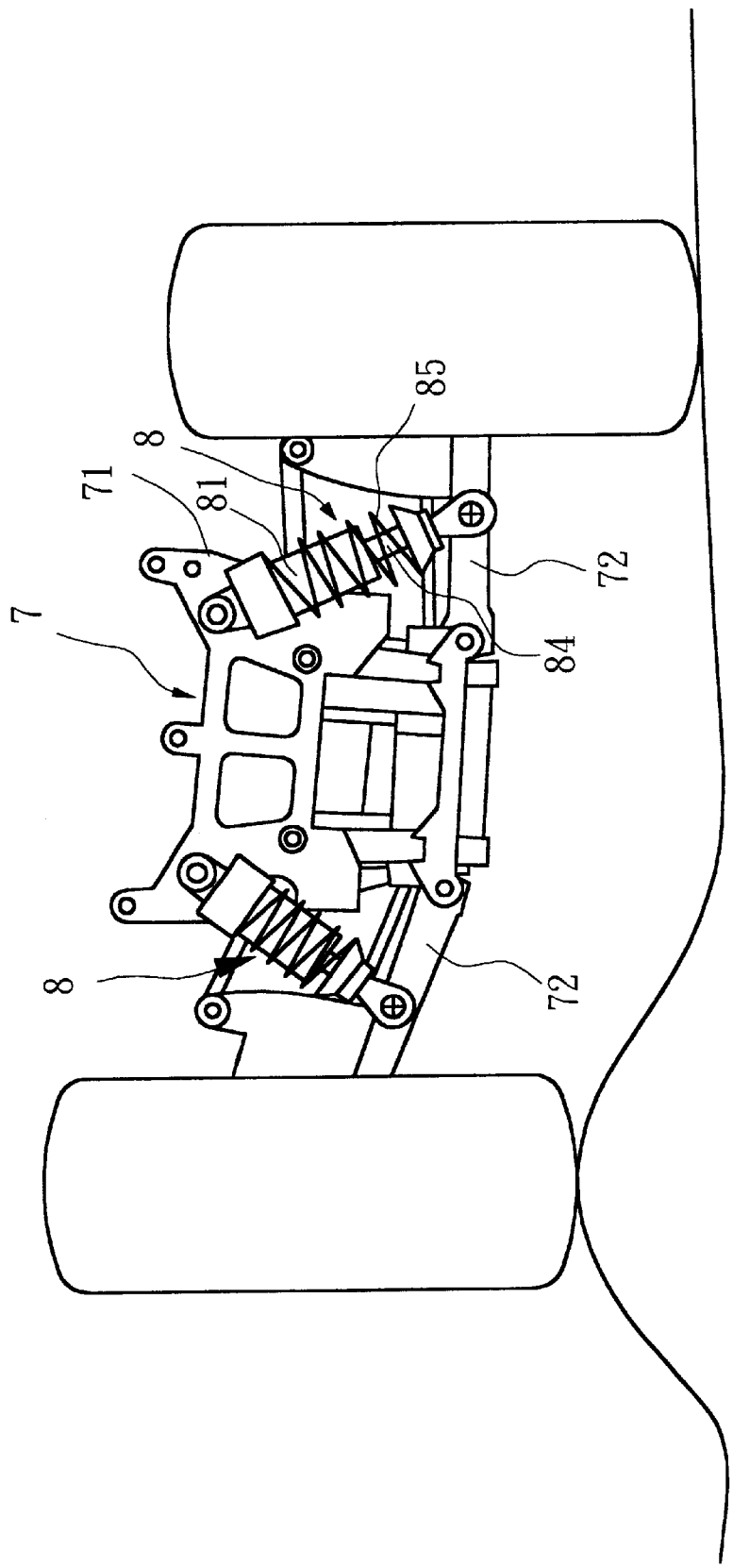
FIG. 6 is a schematic rear plan view of a shock absorber for a radio control model.
Figure 7:
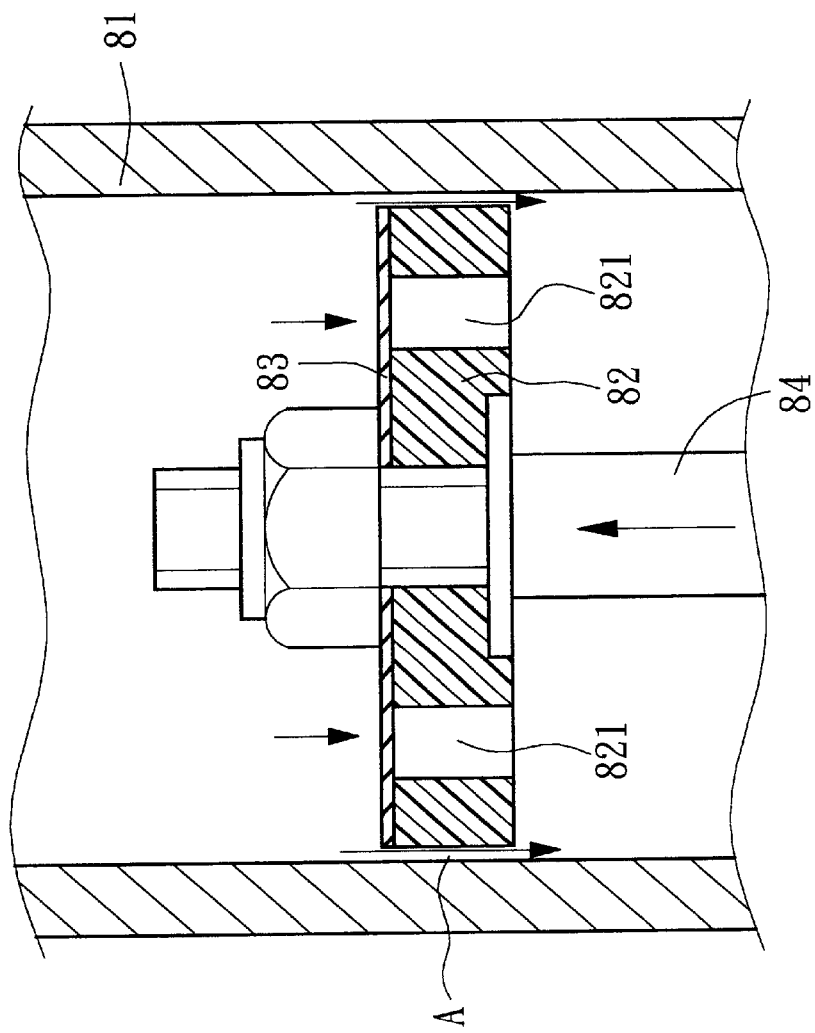
FIG. 7 is partial side cross sectional view of a conventional shock absorber for a radio control model in accordance with the prior art when the piston is upwardly moved for absorbing shock.
Figure 8:
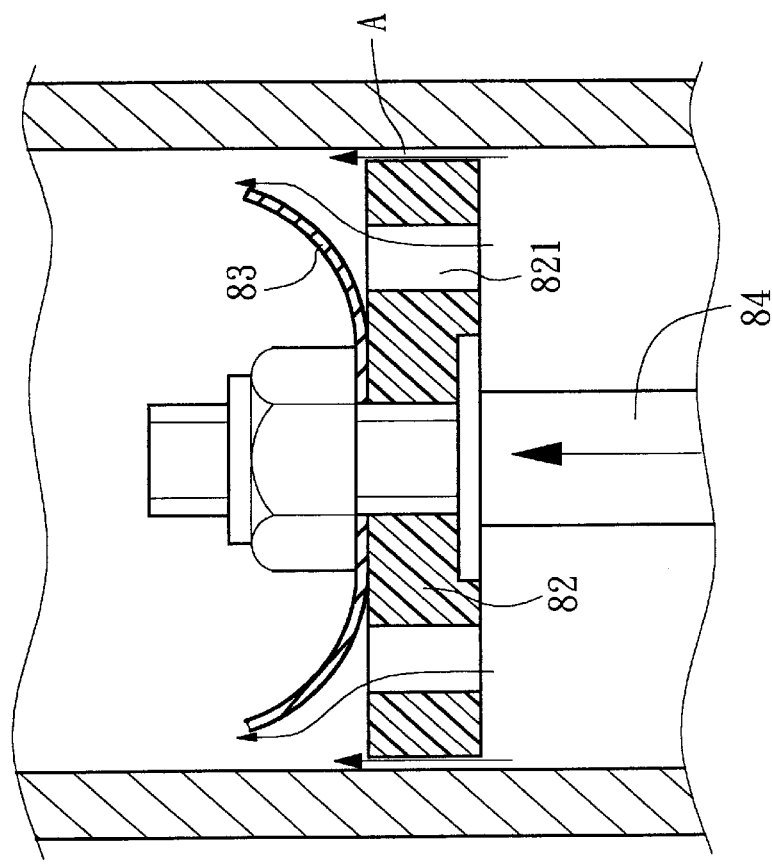
FIG. 8 is partial side cross sectional view of a conventional shock absorber for a radio control model in accordance with the prior art when the piston is downward moved.

With reference to FIG. 5, the stopper (23) is upwardly pushed by the oil of backflow during the piston (2) moving to the original condition due to the pressure of compressed oil and the restitution force of the spring (15) when the shock disappears. Consequently, the second through hole (221) is opened and some of the first through holes (211), aligning with the second through hole (221), are closed such that the damping modulus of the shock absorber becomes smaller than that of the shock absorber when the stopper (23) closes the second through hole (221) because the oil of backflow can flow through the second through hole (221), the non-closed first through hole (211) and the gap (B) such that the piston (82) quickly moves back to the original position.

As described above, the stopper (23) is used to substitute the plastic film of the conventional shock absorber because the stopper (23) is hard to be transfigured or broken such that the shock absorber in accordance with the present invention still has a good shock absorbing effect even being used for a long time. Furthermore, the damping modulus is adjustable due to the number of the first through hole (211), second through hole (221) and the stopper (23).

Although the invention has been explained in relation to its preferred embodiment, it is to be understood that many other possible modifications and variations can be made without departing from the spirit and scope of the invention as hereinafter claimed.

What is claimed is:

1. A shock absorber for a radio control model, comprising:
   a cylinder having an upper end adapted to be pivotally connected to a frame of the radio control model;
   a piston reciprocally movably received in the cylinder, the piston having a diameter smaller than a internal diameter of the cylinder such that a gap is formed between an outer periphery of the piston and an inner periphery of the cylinder, the piston including:
      an annular groove radially defined in the periphery of the piston and dividing the piston into a first portion corresponding to the upper end of the cylinder and a second portion opposite to the first portion of the piston;
      at least two first through holes defined in the first portion of the piston and communicating with the annular groove;
      at least one second through hole defined in the second portion of the piston and communicating with the annular groove, wherein at least one of the second through hole co-axially aligning with a corresponding one of the at least two through holes and the number of the first through holes is greater than that of the second through hole; and
      at least one stopper longitudinally movably received in the piston between one of at least two first through holes and the at least one second through hole that align with each other for selectively closing the first through hole and the second through hole; and
   a shaft having a first end extending into the cylinder and securely connected to the piston, and a second end pivotally connected to a linkage of the radio control model.

2. The shock absorber as claimed in claim 1, wherein the stopper is a steel ball and has a diameter greater than a width of the annular groove in the piston.

3. The shock absorber as claimed in claim 2, wherein the second through hole has a diameter greater than that of the first through hole.

4. The shock absorber as claimed in claim 2, wherein the piston comprises six first through holes defined in the first portion of the piston and three second through holes defined in the second portion of the piston, each second through hole co-axially aligning with a corresponding one of the first through hole in the first portion of the piston.

5. The shock absorber as claimed in claim 1, wherein the second through hole has a diameter greater than that of the first through hole.

6. The shock absorber as claimed in claim 5, wherein the piston comprises six first through holes defined in the first portion of the piston and three second through holes defined in the second portion of the piston, each second through hole co-axially aligning with a corresponding one of the first through hole in the first portion of the piston.

7. The shock absorber as claimed in claim 1, wherein the piston comprises six first through holes defined in the first portion of the piston and three second through holes defined in the second portion of the piston, each second through hole co-axially aligning with a corresponding one of the first through hole in the first portion of the piston.

* * * * *